US012692669B2

(12) United States Patent
Banba et al.

(10) Patent No.: US 12,692,669 B2
(45) Date of Patent: Jul. 28, 2026

(54) METHOD FOR CONSTRUCTING A BASE COURSE AND A MIXTURE USED THEREFOR

(71) Applicant: Nichireki Group Co., Ltd., Tokyo (JP)

(72) Inventors: Koki Banba, Tochigi (JP); Tomio Hiraoka, Tochigi (JP); Hiroyuki Iitaka, Tochigi (JP); Takahiro Yamamoto, Tokyo (JP)

(73) Assignee: NICHIREKI GROUP CO. LTD., Tokyo (JP)

( * ) Notice: Subject to any disclaimer, the term of this patent is extended or adjusted under 35 U.S.C. 154(b) by 864 days.

(21) Appl. No.: 17/995,142

(22) PCT Filed: Mar. 30, 2021

(86) PCT No.: PCT/JP2021/013716
§ 371 (c)(1),
(2) Date: Sep. 30, 2022

(87) PCT Pub. No.: WO2021/201051
PCT Pub. Date: Oct. 7, 2021

(65) Prior Publication Data
US 2023/0243109 A1 Aug. 3, 2023

(30) Foreign Application Priority Data

Mar. 30, 2020 (JP) ................................. 2020-061563

(51) Int. Cl.
*E01C 7/26* (2006.01)
*C04B 14/04* (2006.01)
(Continued)

(52) U.S. Cl.
CPC ................ *E01C 7/26* (2013.01); *C04B 14/04* (2013.01); *C04B 28/04* (2013.01);
(Continued)

(58) Field of Classification Search
CPC .......... E01C 7/26; E01C 19/463; E01C 7/182; E01C 23/00; C04B 14/04; C04B 28/04;
(Continued)

(56) References Cited

U.S. PATENT DOCUMENTS

| 2009/0092846 A1* | 4/2009 | Takamura | ............. C04B 41/009 |
| | | | 427/136 |
| 2012/0031303 A1* | 2/2012 | Constantz | ............... C04B 14/26 |
| | | | 106/640 |

(Continued)

FOREIGN PATENT DOCUMENTS

| CA | 2992496 C | * | 1/2024 | ............. C08L 91/00 |
| CN | 201003132 Y | | 1/2008 | |

(Continued)

OTHER PUBLICATIONS

JP52087920A Machine translation (Year: 1977).*

(Continued)

*Primary Examiner* — Pamela H Weiss
(74) *Attorney, Agent, or Firm* — FISHERBROYLES, LLP; Roger L. Browdy

(57) ABSTRACT

A method is provided for constructing a base course without rolling compaction, in which a compacting step by rolling compaction and further adjustment of the water content of the mixture to the optimum water content are not necessary, and to provide a mixture for base course, which enables the said method. The method includes a obtaining a mixture by mixing an aggregate, an asphalt emulsion, and a cement, wherein the mixture is in a high-water-content state in which a water content of the mixture is above an optimum water content of the aggregate, and spreading the mixture.

11 Claims, 4 Drawing Sheets

(51) Int. Cl.
    *C04B 28/04*        (2006.01)
    *C04B 40/00*        (2006.01)
    *C04B 111/00*       (2006.01)
    *E01C 19/46*        (2006.01)

(52) U.S. Cl.
    CPC ........ *C04B 40/0032* (2013.01); *E01C 19/463*
          (2013.01); *C04B 2111/0075* (2013.01)

(58) Field of Classification Search
    CPC ........... C04B 4/0032; C04B 2111/0075; C04B
            2111/00103; C04B 28/02; C04B 24/36;
                                Y02W 30/91
    See application file for complete search history.

(56)              References Cited

U.S. PATENT DOCUMENTS

| | | | |
|---|---|---|---|
| 2019/0077710 A1 * | 3/2019 | Yuan | C04B 26/26 |
| 2021/0171775 A1 * | 6/2021 | Le | C08K 11/00 |

FOREIGN PATENT DOCUMENTS

| | | | | |
|---|---|---|---|---|
| EP | 0 380 704 | | 8/1990 | |
| JP | 52087829 A | * | 7/1977 | |
| JP | 59-224705 A | | 12/1984 | |
| JP | 60-144402 A | | 7/1985 | |
| JP | 61-221404 A | | 10/1986 | |
| JP | H10325107 A | | 12/1998 | |
| JP | H116103 A | * | 1/1999 | |
| JP | 2002069922 A | | 3/2002 | |
| JP | 2002-161508 A | | 6/2002 | |
| JP | 2006177072 A | | 7/2006 | |
| JP | 2008036532 A | | 2/2008 | |
| JP | 2012207521 A | * | 10/2012 | |
| JP | 2013091982 A | | 5/2013 | |
| KR | 10-2020594 B1 | | 10/2019 | |
| WO | WO-9001469 A1 | * | 2/1990 | ........ C04B 20/1044 |
| WO | 2008/026811 A1 | | 3/2008 | |
| WO | 2017/179759 A1 | | 10/2017 | |
| WO | 2019021740 A1 | | 1/2019 | |

OTHER PUBLICATIONS

WO9001469 Mach Translation (Year: 1990).*
JP2012207521 Machine Translation (Year: 2012).*
Translation 20 9001469A1 (Year: 1990).*

* cited by examiner

[Figure 1]
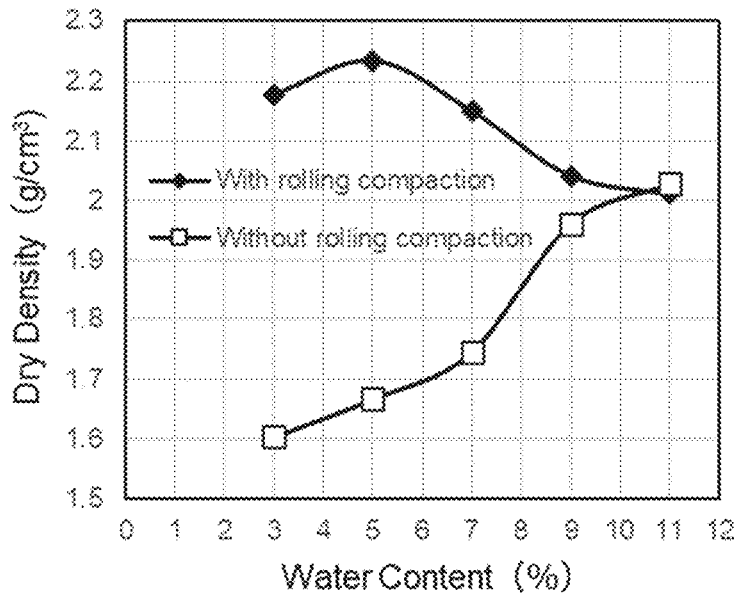
[Figure 2]
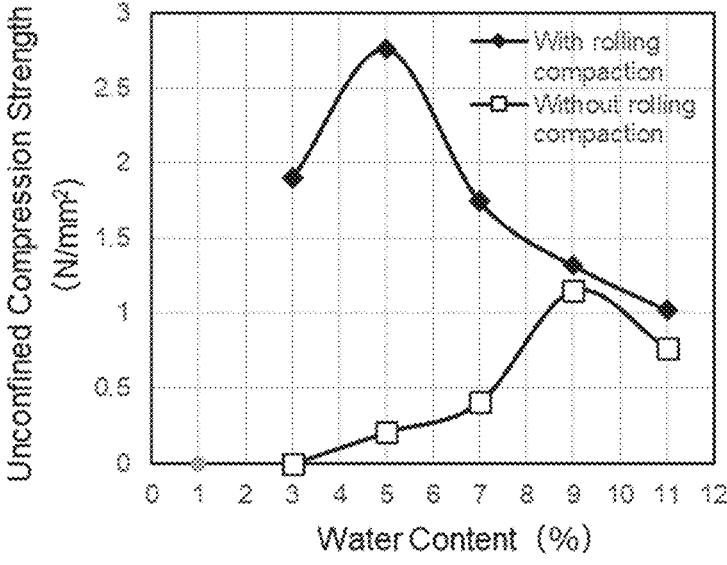

[Figure 3]
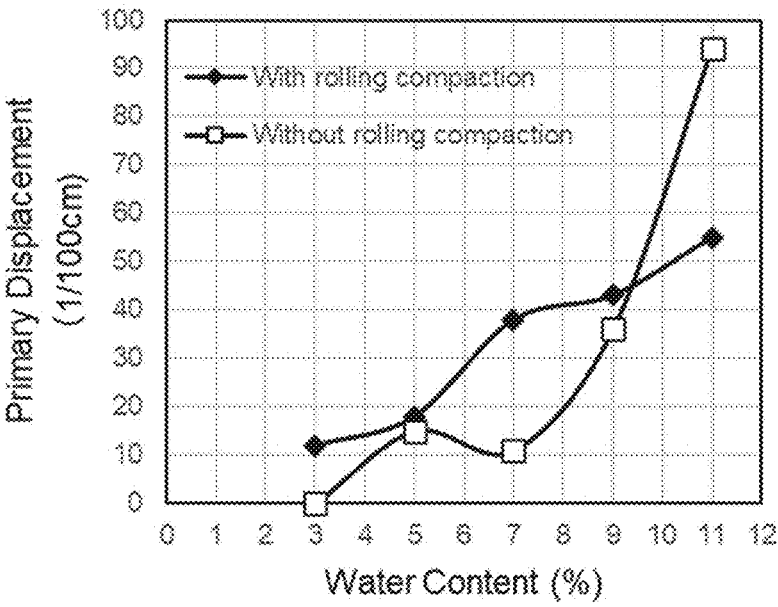
[Figure 4]
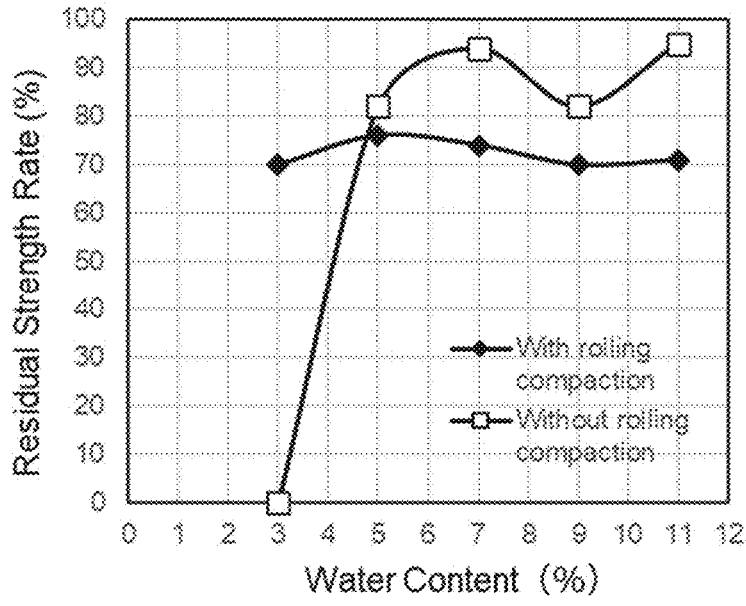

[Figure 5]
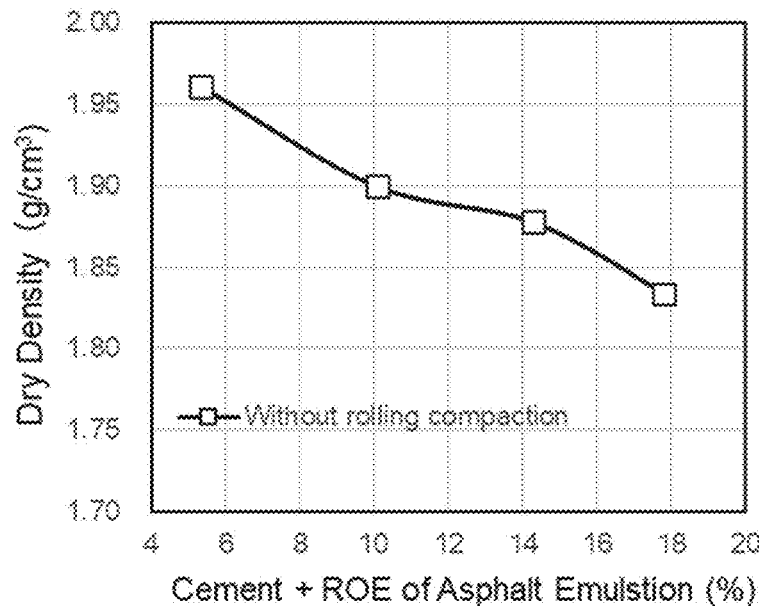
[Figure 6]
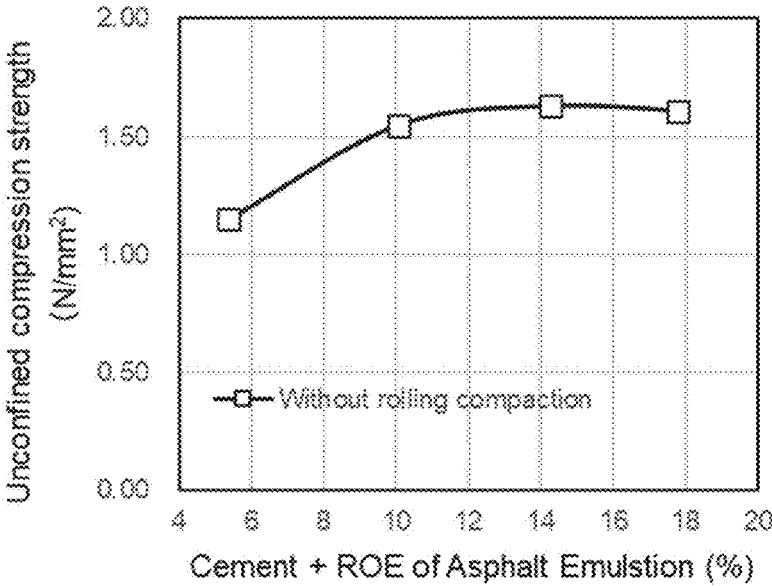

[Figure 7]
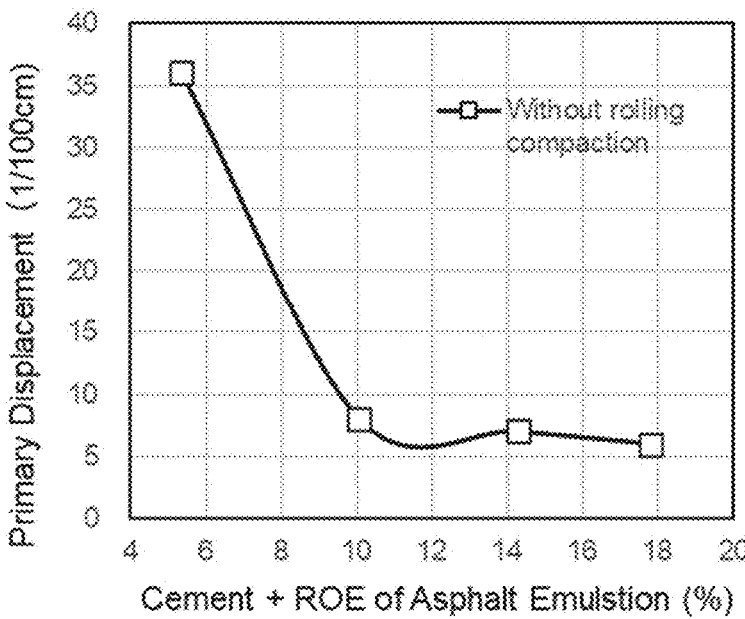
[Figure 8]
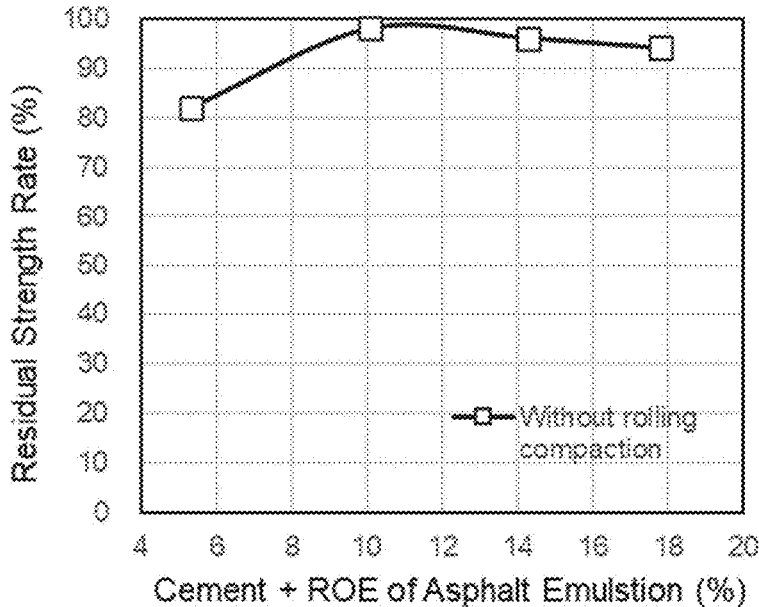

METHOD FOR CONSTRUCTING A BASE COURSE AND A MIXTURE USED THEREFOR

TECHNICAL FIELD

The present invention relates to a method for constructing a base course and a mixture for constructing a base course used in the method.

BACKGROUND ART

A base course forms a pavement together with a surface course and a binder course and play an important role to disperse and transfer the traffic load to the subgrade. Even when a pavement is damaged, if the damage extends no further than a surface course and a binder course, the pavement may be repaired by surface treatment or overlay. Meanwhile, if the damage is caused by a defect in the base course because of the deterioration of the base course, etc., it would be necessary to replace the pavement including its base course. It is costly to replace a pavement. Replacing a pavement further has a drawback that it would generate a large amount of waste because of the removal of the existing pavement.

Instead of replacing pavement, an on-site base course recycling construction method has been proposed (For example, please refer to Patent Literatures 1 to 3.). The on-site base course recycling construction method is a method to construct a recycled base course by excavating an existing pavement, crushing the excavated materials, mixing additives, such as an asphalt emulsion and/or a cement, to the crushed materials, and compacting the mixture on-site.

The above method recycles a large part of the existing pavement on site. It is therefore advantageous in that fewer materials need to be carried in and carried out, the generation of a large amount of waste can be avoided, less energy is required, limited resources can be effectively utilized, and the $CO_2$ emission can be reduced. It is further advantageous in that a pavement can be constructed at a lower cost compared to the replacing method.

The conventional methods for constructing a base course, including both the replacing method and the on-site base course recycling construction method and further the method for newly constructing a base course, require a step of compacting base course materials that are spread on the construction surface by rolling compaction. The rolling compaction of the base course materials should be conducted very carefully and thoroughly because the degree of rolling compaction affects the strength of the constructed base course. The rolling compaction is usually conducted using a large equipment such a road roller and a pneumatic tire roller and accordingly there is the inconvenience that the construction becomes large-scale and requires a great deal of energy.

In addition, it is generally said that the degree of rolling compaction varies greatly depending on the water content of the mixture that is to be compacted. In other words, when the water content of the mixture that is to be compacted is at the optimum water content, the mixture can be most densely compacted by rolling compaction, and the desired strength can be achieved accordingly. In contrast, when the water content of the mixture departs from the optimum water content, the mixture cannot be compacted ideally and accordingly the mixture after compaction has much lower density and strength compared to the case that the water content of the mixture is at the optimum water content. In constructing a base course, the water content of the mixture used for the construction is thus required to be adjusted to the optimum water content. When the water content of the mixture is below the optimum water content, the water content may be adjusted, for example, by adding or spraying additional water to the mixture. In contrast, when the water content of the mixture is above the optimum water content, the adjustment of the water content is extremely difficult, sometimes forcing the constructors to postpone the constructing date.

CITATION LIST

Patent Literature

[Patent Literature 1] Japanese Patent Application Publication No. S59-224705
[Patent Literature 2] Japanese Patent Application Publication No. S60-144 402
[Patent Literature 3] Japanese Patent Application Publication No. S61-221 404

SUMMARY OF INVENTION

Technical Problem

The present invention was made to solve drawbacks of the above-mentioned conventional methods for constructing a base course. An object of the present invention is to provide a method for constructing a base course without rolling compaction, in which a compacting step by rolling compaction and further adjustment of the water content of the mixture to the optimum water content are not necessary, and to provide a mixture for base course, which enables the said method.

Solution to Problem

The present inventors made continuous research effort in order to attain the above object and found that, when a mixture for base course, comprising an aggregate, an asphalt emulsion and a cement, is spread on the construction surface in a high-water-content state in which the water content of the mixture is above the optimum water content of the aggregate comprised in the mixture, surprisingly, a base course having a good strength sufficient for practical use can be constructed without a step of rolling compaction, contrary to the common technical knowledge in the art.

In other words, one embodiment of the present invention attains the above object by providing a method for constructing a base course without rolling compaction, which comprises:

a step of obtaining a mixture by mixing an aggregate, an asphalt emulsion, and a cement, wherein the mixture is in a high-water-content state in which a water content of the mixture is above an optimum water content of the aggregate, and a step of spreading the mixture;

wherein the method does not comprise a step of rolling compaction.

Another embodiment of the present invention attains the above object by providing a mixture for base course, comprising an aggregate, an asphalt emulsion, and a cement, wherein the mixture is in a high-water-content state in which a water content of the mixture is above an optimum water content of the aggregate.

In the method for constructing a base course without rolling compaction of the present invention, basically any mixture which comprises an aggregate, an asphalt emulsion, and a cement, and is in a high-water-content state in which a water content of the mixture is above an optimum water content of the aggregate may be used. However, from a viewpoint of constructing a base course with a more stable strength, the mixture may preferably comprise the asphalt emulsion and the cement in such an amount that the sum of the mass of a residue on evaporation of the asphalt emulsion and the mass of the cement is 10% by mass or more of the total dry solid content of the mixture. For example, when the mixture comprises only the aggregate, the asphalt emulsion, and the cement, the total dry solid content of the mixture equals to the sum of the dry mass of the aggregate, the mass of a residue on evaporation of the asphalt emulsion, and the mass of the cement. When the mixture is in the high-water-content state and the sum of the mass of a residue on evaporation of the asphalt emulsion and the mass of the cement is 10% by mass or more of the total dry solid content of the mixture, there is an advantage that a recycled base course with a more stable strength can be constructed without a step of rolling compaction.

In a preferred embodiment of the method for constructing a base course without rolling compaction of the present invention, the mixture may comprise the asphalt emulsion and the cement such that a ratio (A/B) of the mass of a residue on evaporation of the asphalt emulsion (A) relative to the mass of the cement (B) is in the range of 0.7 or more and 1.2 or less. When the mixture comprises the asphalt emulsion and the cement at a ratio within the above range, the hardness imparted by the cement is appropriately mitigated by an asphalt, and thereby construction of a base course with a stable strength and an appropriate hardness may be enabled. In the thus obtained base course, cracking of the base course may be effectively reduced. Furthermore, since the thus constructed base course contains an appropriate amount of an asphalt, it shows the better affinity to an asphalt mixture to be laid on the base course and accordingly the stronger adhesiveness between the two layers may be advantageously achieved.

Furthermore, in a preferred embodiment of the method for constructing a base course without rolling compaction of the present invention, the mixture may further comprise a fiber material in addition to the aggregate, the asphalt emulsion, and the cement. When the mixture further comprises the fiber material, the fiber material works cooperatively with an asphalt comprised in the mixture and imparts the better cracking resistance to the base course.

The mixture used in the method for constructing a base course without rolling compaction of the present invention may be prepared in any method. For example, the mixture may be prepared in a plant mixing method in which materials are mixed in advance at a plant, or the mixture may be also prepared at a site of the construction by mixing materials on-site. In some embodiments, the crushed base course of the existing pavement may be used as the aggregate. In these cases, the mixture may be prepared in a mixed-in-place method, in which the crushed base course, the asphalt emulsion, the cement, and, if necessary, the fiber material, are mixed at a spot where the existing pavement is excavated and crushed. Nevertheless, the crushed base course obtained by excavating and crushing the existing pavement may be transported to a plant, mixed with other materials at the plant, and then transported to the site of construction. In any of these cases, the aggregate, the asphalt emulsion, the cement, and, if necessary, the fiber material, may be mixed in any order. However, when the mixture is prepared in the above described mixed-in-place method, it may be preferable to mix at least the asphalt emulsion and the cement in advance and then mix the aggregate therein. When the asphalt emulsion and the cement are mixed in advance and then the aggregate is mixed therein, not only the operation of on-site mixing becomes simple and easy but also it is convenient because it becomes not necessary to spread the cement on the construction surface in advance.

A base course constructed by the method of constructing a base course without rolling compaction of the present invention may be any base course, including but not limited to a new base course which is constructed when newly constructing a pavement, a base course which is constructed by the replacement method, or a base course which is constructed by the base course recycling construction method, such as the on-site base course recycling construction method.

Effects of Invention

In accordance with the method for constructing a base course without rolling compaction and the mixture for a base course of the present invention, a base course with a stable strength, and, in some embodiments, an appropriate hardness may be advantageously constructed without a step of rolling compaction, which requires a great deal of energy. In accordance with the method for constructing a base course without rolling compaction and the mixture for a base course of the present invention, there are advantages that the requirements for construction condition may be greatly relaxed and the more flexible construction may be enabled, because the mixture comprising the aggregate, the asphalt emulsion, and the cement, just needs to be in the high-water-content state in which the water content of the mixture is above the optimum water content of the aggregate, and there is no need to strictly adjust the water content of the mixture to the optimum water content.

BRIEF DESCRIPTION OF DRAWINGS

FIG. 1 A drawing showing a relationship between a water content and a dry density.

FIG. 2 A drawing showing a relationship between a water content and an unconfined compression strength.

FIG. 3 A drawing showing a relationship between a water content and a primary displacement, FIG. 4 A drawing showing a relationship between a water content and a residual strength rate.

FIG. 5 A drawing showing a relationship between a total content of a cement plus a residue on evaporation (ROE) and a dry density.

FIG. 6 A drawing showing a relationship between a total content of a cement plus a residue on evaporation (ROE) and an unconfined compression strength.

FIG. 7 A drawing showing a relationship between a total content of a cement plus a residue on evaporation (ROE) and a primary displacement.

FIG. 8 A drawing showing a relationship between a total content of a cement plus a residue on evaporation (ROE) and a residual strength rate.

DESCRIPTION OF EMBODIMENTS

As described above, the method for constructing a base course without rolling compaction in accordance with one embodiment of the present invention comprises:

a step of obtaining a mixture by mixing an aggregate, an asphalt emulsion, and a cement, wherein the mixture is in a high-water-content state in which a water content of the mixture is above an optimum water content of the aggregate, and a step of spreading the mixture;

wherein the method does not comprise a step of rolling compaction. Explanations on each step are provided below.

A step of obtaining a mixture by mixing an aggregate, an asphalt emulsion, and a cement, wherein the mixture is in a high-water-content state in which a water content of the mixture is above an optimum water content of the aggregate is literally a step of mixing the aggregate, the asphalt emulsion, and the cement to obtain the mixture in the high-water-content state in which the water content of the mixture is above the optimum water content of the aggregate. In this step, at least an aggregate, an asphalt emulsion, and a cement are mixed to obtain a mixture, which comprises the aggregate, the asphalt emulsion, and the cement, and is in a high-water-content state in which a water content of the mixture is above an optimum water content of the aggregate. It goes without saying that materials other than the aggregate, the asphalt emulsion, and the cement may be mixed together.

The aggregate may be any aggregate, including a newly prepared base course material, such as a crushed stone, etc. A crushed base course obtained from a base course of an existing pavement may be reused as a part or the whole of the aggregate. The crushed base course may be obtained by excavating an existing pavement to the depth extending to at least a part of a base course of the existing pavement, and crushing the excavated products, on-site at a spot where a base course is to be constructed using the method in accordance with an embodiment of the present invention. However, in some embodiments, a crushed base course obtained by excavating and crushing an existing pavement at an other construction site may be also used.

In some embodiments, the aggregate may be the crushed base course obtained by excavating an existing pavement to the depth extending to at least a part of a base course of the existing pavement, and crushing the excavated product, on-site at a spot where a base course is to be constructed. This means that the method in accordance with one embodiment of the present invention may comprise a step of obtaining the aggregate by excavating an existing pavement to the depth extending to at least a part of a base course of the existing pavement and crushing the excavated product, on-site at a spot where a base course is to be constructed. In this case, the step of obtaining the mixture by mixing the crushed base course as the aggregate, the asphalt emulsion, the cement, etc., may be preferably conducted on-site at the spot. Herein, the step of obtaining the aggregate by excavating an existing pavement to the depth extending to at least a part of a base course of the existing pavement and crushing the excavated product, is essentially the same as that of the conventional base course recycling construction method. The above step may be conducted using any type of machinery or equipment. However, it may be typically conducted using a mixed-in-place type stabilizer or a mixed-in-place type road stabilizer.

When the aggregate is the crushed base course, which is obtained by excavating an existing pavement to the depth extending to at least a part of a base course of the existing pavement and crushing the excavated product on-site at a spot where a base course is to be constructed, the depth of excavating the existing pavement may be any depth at which at least a part of a base course can be excavated and crushed.

For example, the existing pavement may be excavated as deep as the depth covering the thickness of a base course that is planned to be made into a recycled base course by stabilization, and then the excavated base course may be crushed. A part or the whole of a sufficient amount of the cement may be spread on the construction surface prior to excavating and crushing the existing pavement so that the existing pavement can be excavated and crushed together with the cement spread on the construction surface.

The asphalt emulsion that is mixed with the aggregate may be any asphalt emulsion. For example, the asphalt emulsion may contain any type of asphalt, including, but not limited to, straight asphalt, blown asphalt, semi-blown asphalt, natural asphalt, solvent deasphalted asphalt, and a modified asphalt, which is a mixture of any one or more of these asphalts and styrene-butadiene-styrene block copolymer (SBS), styrene-isoprene-styrene block copolymer (SIS), styrene-butadiene random copolymer (SBR), ethylene-vinyl acetate copolymer (EVA), ethylene-ethyl acrylate copolymer (EEA), styrene-ethylene-butylene-styrene block copolymer (SEBS), natural rubber (NR), chloroprene rubber (CR), isoprene rubber (IR), petroleum resin, oil, etc. Examples of the oil include, but not limited to, aromatic hydrocarbons and aliphatic hydrocarbons, Examples of the petroleum resins include, but not limited to, C9 petroleum resin and terpene phenol. Furthermore, any one or a mixture of rubber latex, a synthetic polymer emulsion and a water-soluble polymer may be added as a modifier to an emulsifier, or may be added to the asphalt emulsion after preparation of the asphalt emulsion.

An emulsifier used in emulsifying the asphalt emulsion may be any type, including cationic emulsifier, nonionic emulsifier, and anionic emulsifier. When good mixability with the crushed base course is desired, a nonionic asphalt emulsion, which is prepared by using a nonionic surfactant as an emulsifier, may be particularly preferred. On the other hand, when a rapid strengthening is desired, a cationic asphalt emulsion, which is prepared by using a cationic surfactant as an emulsifier, may be preferred.

The cement used in the method of present invention may be any cement, including, but not limited to, Portland cement, such as ordinary Portland cement, early strength Portland cement, high early strength Portland cement, moderate heat Portland cement, and low heat Portland cement, blast furnace slag cement, silica cement, flyash cement, jet cement, alumina cement, and so on. In particular, when shorter construction time is desired, high early strength Portland cement and early strength Portland cement may be preferably used because of their rapid strengthening property. On the other hand, when crack generation during strengthening is concerned, moderate heat Portland cement and low heat Portland cement may be preferably used, Meanwhile, a hydrated lime and a quick lime may be also used as the cement. In other words, a hydrated lime and a quick lime are included in the scope of the cement that can be used in the method and the mixture of the present invention.

The above-mentioned materials may be mixed in any order, and any equipment may be used for the mixing. For example, the mixing may be conducted in the above-described plant mixing method or conducted on-site using an appropriate mixer carried to a construction site. On the other hand, as described above; when the crushed base course, which is obtained by excavating an existing pavement to the depth extending to at least a part of a base course of the existing pavement and crushing the excavated products, is used as the aggregate, the mixing may be conducted in the mixed-in-place construction method; in which the crushed base course as the aggregate, the asphalt emulsion, and the cement are mixed on-site at the spot where excavating and crushing are conducted. Since road stabilizers usually comprise a feature for ejecting and/or spraying an asphalt emulsion and other additives, in addition to features for excavating and crushing, it is able to mix the crushed base course and the asphalt emulsion by spraying the asphalt emulsion to the crushed base course during excavating and crushing.

When the mixing is conducted in the mixed-in-place method, the cement may be mixed with the crushed base course as the aggregate by spreading a part or the whole of a sufficient amount of the cement on the construction surface of the existing pavement in advance and thereafter excavating and crushing the existing pavement together with the cement spread on the construction surface. In other embodiments, the cement may be mixed with the crushed base course as the aggregate by spreading the cement on the crushed base course at the same time with and/or around the same time with spraying the asphalt emulsion on the crushed base course. These two mixing methods may be used in combination. Nevertheless, it may be the easiest and preferable to mix the asphalt emulsion and the cement at a predetermined ratio in advance and thereafter mix them with the crushed base course by ejecting/spraying the asphalt emulsion and the cement together onto the crushed base course from the nozzle which is used to eject/spray an asphalt emulsion.

The mixture may further comprise a fiber material, in addition to the above-described aggregate, asphalt emulsion, and cement, in order to increase, for example, the cracking resistance of a base course that is to be constructed. Examples of the fiber material that may be mixed in the mixture may include, but not limited to, mineral fibers, such as basalt fiber; glass fibers; organic fibers, such as carbon fiber, vinylon, and cellulose; and steel fibers. The diameter of the fiber material may be preferably in the range of 5 μm or more and 100 μm or less. The fiber length of the fiber material may be preferably in the range of 5 mm or more and 40 mm or less. The fiber material may be preferably mixed in the mixture at a ratio of 0.1% by mass or more and 5.0% by mass or less relative to the mass of the aggregate comprised in the mixture.

The above mixture may further comprise other materials, such as a water reducing agent, an expansive admixture, an anti-shrinkage agent, etc., which are usually used in concrete. Examples of the water reducing agent may include one or more selected from a high-performance water reducing agent, a water reducing agent, an AE water reducing agent, and a high-performance AE water reducing agent, which are described in JIS A 6204 "Chemical admixture for concrete". Examples of a main ingredient of these water reducing agents may include one or more selected from formaldehyde condensates, such as naphthalenesulfonic acid, lignosulfonic acid, melamine sulfonic acid, and so on; polycarbonic acids; and their sodium salts, potassium salts, calcium salts, and so on. The addition amount of these water reducing agents may be preferably in the range of 0% by mass or more and 3.0% by mass or less relative to the mass of the cement comprised in the mixture.

In one embodiment of the method for constructing a base course without rolling compaction, the mixture in a high-water-content state in which a water content of the mixture is above the optimum water content of the aggregate is obtained by mixing the aggregate, the asphalt emulsion, the cement, if necessary, additives such as the fiber material, the water reducing agent, etc., and further adding additional water, if necessary.

Herein, the water content (w (%)) is a ratio of the mass of water contained in the mixture (Ww) relative to the dry mass of the mixture (Ws) expressed in a percentage, which is obtained from the below Formula 1.

$$w = (Ww/Ws) \times 100[\%]$$

Formula 1

The optimum water content is the water content at which a dry density of soils, a base course material, and so on, after compaction gets maximized, as described in JIS A1210 "Test method for soil compaction using a rammer" as follows: "Measured values are plotted taking a dry density on the y-axis and the water content on the x-axis, and then the plots are connected with a smooth curve to obtain the dry density-water content curve. A maximum value of the dry density in this curve is regarded as the maximum dry density $\rho_{dmax}$ (g/cm$^3$), and a water content corresponding to the maximum dry density is regarded as the optimum water content $W_{opt}$ (%)."

The optimum water content of the aggregate comprised in the mixture can be obtained by the method described in JIS A1210 "Test method for soil compaction using a rammer" or by a method equivalent to the method. When the crushed base course, which obtained by excavating an existing pavement to the depth extending to at least a part of a base course of the existing pavement and crushing the excavated product, is used as the aggregate, and the crushed base course is mixed with other materials on-site at the spot where excavating and crushing are conducted, the optimum water content of the aggregate may be obtained by sampling in advance a part of an existing pavement to be excavated as deep as the depth planned to be excavated in the construction; crushing the obtained sample to the particle size as small as the size of particles that are expected to be obtained in the construction; and then conducting the test method for compaction using the crushed sample while changing the water content of the crushed sample appropriately.

On the other hand, the water content w of the mixture obtained by mixing the aggregate, the asphalt emulsion and the cement, is a ratio of the mass of water contained in the mixture (Ww) relative to the dry mass of the mixture (Ws), as above described. Accordingly, the water content w of the mixture can be obtained based on the amount of water in the aggregate to be used, the amount of water in the asphalt emulsion to be used, and a mixing ratio of the aggregate, the asphalt emulsion, and the cement. When the fiber material is further mixed in the mixture, it goes without saying that a mixing ratio of the fiber material is taken into consideration, To be added, the amount of water in the aggregate can be obtained by comparing the mass of the aggregate before and after drying. Meanwhile, when the crushed base course, which is obtained by excavating an existing pavement to the depth extending to at least a part of a base course of the existing pavement and crushing the excavated product, is used as the aggregate, and the crushed base course is mixed with other materials on-site at the spot where excavating and crushing are conducted, it may be preferable to obtain the amount of water in the aggregate by sampling a part of the existing pavement that constitutes a construction surface in advance and determining the amount of water in the sample, similarly as when the optimum water content of the aggregate is determined.

The thus determined water content of the mixture may be already above the optimum water content of the aggregate. In this case, the mixture may be prepared by mixing the aggregate, the asphalt emulsion, the cement, and, if necessary, the fiber material at the same ratio as when the water content of the mixture is determined. Meanwhile, in some instances, the determined water content of the mixture may be equal to or below the optimum water content of the aggregate. In this case, the mixture may be further added with an appropriate amount of additional water. When the crushed base course, which is obtained by excavating an existing pavement to the depth extending to at least a part of a base course of the existing pavement and crushing the excavated products, is used as an aggregate, and the crushed base course is mixed with other materials on-site at the spot where excavating and crushing are conducted, the water content of the obtained mixture may be adjusted to above the optimum water content by spraying or sprinkling an appropriate amount of water on the construction surface prior to excavating and crushing the existing pavement, during excavation, and/or during a step of preparing the mixture.

The mixture for a base course used in the method for constructing a base course without rolling compaction of the present invention is not limited as long as it comprises the aggregate, the asphalt emulsion, and the cement and it is in the high-water-content state in which the water content of the mixture is above the optimum water content of the aggregate used. However, from a viewpoint of constructing a base course with a more stable strength, the mixture may preferably comprise the asphalt emulsion and the cement in such an amount that the sum of the mass of a residue on evaporation of the asphalt emulsion and the mass of the cement is 10% by mass or more of the total dry solid content of the mixture.

The mixture may comprise the asphalt emulsion and the cement at any ratio. Generally speaking, when the amount of the cement becomes larger compared to the amount of an asphalt contained in the asphalt emulsion, the hardness of a recycled base course to be constructed tends to be increased. Meanwhile, when the amount of an asphalt contained in the asphalt emulsion becomes larger compared to the amount of the cement, the flexibility of a recycled base course to be constructed tends to be increased. Although it depends on what characteristic is desired for a recycled base course to be constructed, it may be preferable that the mixture comprises the asphalt emulsion and the cement such that a ratio (A/B) of the mass of a residue on evaporation of the asphalt emulsion (A) relative to the mass of the cement (B) is in the range of 0.7 or more and 1.2 or less.

A mixture prepared through the above-described step of obtaining the mixture by mixing the aggregate, the asphalt emulsion and the cement, wherein the mixture is in the high-water-content state in which the water content of the mixture is above the optimum water content of the aggregate, is then spread on a construction surface in the step of spreading the mixture on the construction surface. Since the mixture is in the high-water-content state in which the water content of the mixture is above the optimum water content of the aggregate, the mixture has a relatively large fluidity and thus can be packed densely just by being spread on the construction surface, enabling construction of a base course without rolling compaction. When it is concerned that there may be a void inside the mixture being spread on the construction surface, the void may be reduced by applying vibration appropriately to the mixture spread on the construction surface. The vibration may be applied using a rammer, vibrator, etc. The mixture spread on the construction surface hardens over time and thus a base course is constructed.

Generally speaking, the step of rolling compaction requires a great deal of energy. Accordingly, it is a big advantage of the method in accordance with the present invention that a base course can be constructed without the step of rolling compaction. Meanwhile, in the conventional method that requires the step of rolling compaction, the strength of the constructed base course varies depending on the degree of compaction by rolling. This leads to a drawback that there may be a local variation in the strength of the constructed base course, unless the compaction is done with an equal and constant strength over the entire construction surface. In contrast, because the method for constructing a base course without rolling compaction in accordance with the present invention does not require a step of rolling compaction, the drawback of the conventional method that there may be a local variation in the strength of the constructed base course would be eliminated.

Below, the present invention is explained in further detail based on experiments.

<Experiment 1: Effect of the Water Content on the Characteristics of the Mixture>

Samples 1, 2, 3, 4, and 5, having the varying water content of 3.0% by mass, 5.0% by mass, 7.0% by mass, 9.0% by mass, and 11.0% by mass, respectively, were prepared using the below described material and following the formulation shown in the below Table 1. Each of Samples 1 to 5 was split into two parts. One part was filled in a mold and rammed 50 times from each side by a Marshall Rammer, to obtain a model mixture with rolling compaction (hereinafter also referred to as "with rolling compaction"). Another part was filled in a mold but not rammed by a Marshall Rammer Instead, after being filled in a mold, voids were removed by lightly poking with a rod, to obtain a model mixture without rolling compaction (hereinafter also referred to as "without rolling compaction").

Materials used in this experiment are as described below:

Aggregate: Graded Crushed Stone (Maximum diameter: 40 mm) (Dried)

Asphalt emulsion: MN-1 (Nonionic asphalt emulsion for mixing) (Solid Content: 57% by mass)

Cement: Ordinary Portland Cement

Herein, the optimum water content of the aggregate (graded crushed stone) obtained by the test method for compaction was 5.0% by mass. The aggregate was dried and then used for the experiment. Accordingly, the mass of the aggregate shown in the below table equals to the dry mass of the aggregate.

TABLE 1

| | Formulation (% by mass) | | | | |
| Materials | Sample 1 | Sample 2 | Sample 3 | Sample 4 | Sample 5 |
| --- | --- | --- | --- | --- | --- |
| Aggregate | 92.5 | | | | |
| Cement | 2.5 | | | | |
| Asphalt Emulsion | 5.0 | | | | |
| | (ROE*: 2.85, Amount of water: 2.15) | | | | |
| Cement + ROE of Asphalt Emulsion (relative to Aggregate + Cement + ROE of Asphalt Emulsion) | 5.5 (=(2.5 + 2.85)/(92.5 + 2.5 + 2.85)) | | | | |
| Total | 100 | | | | |
| | Breakdown of Water Content | | | | |
| Water in Asphalt emulsion (relative to Aggregate + Cement + ROE of Asphalt Emulsion) | 2.20 (=2.15/(92.5 + 2.5 + 2.85)) | | | | |

TABLE 1-continued

| Materials | Sample 1 | Sample 2 | Sample 3 | Sample 4 | Sample 5 |
|---|---|---|---|---|---|
| | Formulation (% by mass) | | | | |
| Additional Water (relative to Aggregate + Cement + ROE of Asphalt Emulsion) | 0.8 | 2.80 | 4.80 | 6.80 | 8.80 |
| Total Water Content | 3.00 | 5.00 | 7.00 | 9.00 | 11.00 |

*ROE: Residue on Evaporation

Each mixture was cured for 7 days. After curing, the dry density (g/cm$^3$), the unconfined compression strength (N/mm$^2$), the primary displacement ($1/100$ cm), and the residual strength rate (%) were measured following the method described in "ROJO SAISEI SEMENTO ASU-FARUTONYUZAI ANTEISHORI HAIGOUSEKKEI NO TEBIKI HEISEI 15 NEN" (JAPAN EMULSIFIED ASPHALT ASSOCIATION). The obtained results were shown in Table 2 and FIGS. 1 to 4.

TABLE 2

| Physical Properties* | | Sample 1 | Sample 2 | Sample 3 | Sample 4 | Sample 5 |
|---|---|---|---|---|---|---|
| | | Water Content (% by mass) | | | | |
| | | 3.00 | 5.00 | 7.00 | 9.00 | 11.00 |
| Dry Density | With rolling compaction | 2.18 | 2.23 | 2.15 | 2.04 | 2.01 |
| | Without rolling compaction | 1.60 | 1.67 | 1.75 | 1.96 | 2.03 |
| Unconfined Compression Strength | With rolling compaction | 1.90 | 2.76 | 1.75 | 1.32 | 1.02 |
| | Without rolling compaction | 0 | 0.21 | 0.41 | 1.15 | 0.77 |
| Primary Displacement | With rolling compaction | 12 | 18 | 38 | 43 | 55 |
| | Without rolling compaction | 0 | 15 | 11 | 36 | 94 |
| Residual Strength Rate | With rolling compaction | 70 | 76 | 74 | 70 | 71 |
| | Without rolling compaction | 0 | 82 | 94 | 82 | 95 |

*Dry Density (g/cm$^3$)
Unconfined Compression Strength (N/mm$^2$)
Primary Displacement (1/100 cm)
Residual strength rate (%)

As shown in Table 2 and FIGS. 1 and 2, for the samples "with rolling compaction", the dry density and the unconfined compression strength of the mixture cured after being filled in a mold (the cured product) reached maximum at the water content of 5.0% by mass (i.e., Sample 2), which was the optimum water content of the aggregate used to prepare the mixture. The dry density and the unconfined compression strength got smaller when the water content got higher than 5.0% by mass.

On the other hand, although the dry density and the unconfined compression strength of the samples "without rolling compaction" were smaller than those of the samples "with rolling compaction" at the water content of 5.0% by mass, which was equal to the optimum water content of the aggregate, the dry density and the unconfined compression strength of the samples "without rolling compaction" gradually increased when the water content went above 5.0% by mass, and drastically increased at the water content of 7.0% by mass or more, which is 1.4 times more than the optimum water content of the aggregate. The reason why the unconfined compression strength of Sample 1 "without rolling compaction" having the water content of 3.0% by mass, which was below the optimum water content of the aggregate, was "0", is because the mixture having the water content of 3.0% was unable to hold together and a specimen for measurement of the unconfined compression strength could not be prepared without compaction. The same applies to the below described measurements for the primary displacement and the residual strength rate.

When the water content reached 9% by mass (Sample 4), which is 1.8 times more than the optimum water content of the aggregate, the dry density and the unconfined compression strength of the mixture (the cured product) "without rolling compaction" became as large as those of the cured product "with rolling compaction". As to the dry density, when the water content reached 11.0% by mass (Sample 5), the cured product "without rolling compaction" showed the dry density higher than the cure product "with rolling compaction".

It appeared that the unconfined compression strength of the cured product "without rolling compaction" became smaller at the water content of 11.0% by mass (Sample 5), and the same trend was observed for the cured product "with compaction". However, the unconfined compression strength of the cured product "without rolling compaction" may be sufficiently improved by increasing the amount of the asphalt emulsion and the cement contained in the mixture or by using a different type of an asphalt emulsion, because the water content of the mixture does not have to be at the optimum water content.

As shown in Table 2 and FIG. 3, for both of the cured product "with rolling compaction" and "without rolling compaction", the primary displacement, which is used as an index for the softness of the cured product, got increased along with the increase of the water content. In particular, the primary displacement of the cured product "with rolling compaction" got drastically increased at the water contents above the optimum water content, and at the water content of 7% by mass (Sample 3), it reached 38 ($1/100$ cm), which is over the upper limit of the general standard range of 5 to 30 ($\frac{1}{100}$ cm). In contrast, the primary displacement of the cured product "without rolling compaction" at the same water content of 7.0% by mass (Sample 3) was 11 ($\frac{1}{100}$ cm), which is still within the permissible range. The primary displacement of the cured product "without rolling compaction" did not go over 30 ($\frac{1}{100}$ cm) until the water content reached 9.0% by mass (Sample 4), and it reached 36 ($\frac{1}{100}$ cm) when the water content reached 9.0% by mass (Sample 4).

As to the residual strength rate, which is used as an index for the remaining strength after reaching the maximum strength, the cured product "without rolling compaction" showed values over "65%", which is generally regarded as a quality standard, at the water content equal to or higher than the optimum water content, as shown in Table 2 and FIG. 4. In addition, at the water content equal to or higher than the optimum water content, the residual strength rates of the cured products "without rolling compaction" were higher than those of the cured products "with rolling compaction". The large residual strength rates of the cured product "without rolling compaction" at the water content above the optimum water content was very surprising and indicates that the cured products "without rolling compaction" retains relatively large residual strength after reaching the maximum strength and is hard to be cracked at the water content above the optimum water content.

As shown above, the cured product with good properties can be obtained even without rolling compaction when the mixture is in a high-water-content state in which the water content of the mixture is above the optimum water content of the aggregate used. In particular, because the physical property of the cured product gets dramatically improved when the water content of the mixture is 1.4 times or more larger than the optimum water content, it is concluded that the mixture should be in a high-water-content state in which the water content of the mixture is above the optimum water content of the aggregate used, and that the mixture may preferably have the water content of 1.4 times or more larger than the optimum water content of the aggregate used.

\<Experiment 2: Effect of an Amount of an Asphalt Emulsion and a Cement on the Physical Property of the Mixture\>

It was shown in Experiment 1 that, when the water content of the mixture is above the optimum water content, the cured product "without rolling compaction" had the dry density and the unconfined compression strength not at all inferior to those of the cured product "with rolling compaction" and also showed the good primary displacement and the good residual strength rate, which are used as an index for the hardness and anti-cracking property. Therefore, in this experiment, the effect of the amount of an asphalt emulsion and a cement contained in the mixture on the physical property of the mixture cured "without rolling compaction" was investigated using the mixtures having the varying amount of an asphalt emulsion and a cement while having the fixed water content of 9.0% by mass, which is above the optimum water content (i.e., 1.8 times larger than the optimum water content).

The same materials used in Experiment 1 were mixed at a ratio shown in the below Table 3 and Samples 6, 7, 8, and 9 containing the varying amount of an asphalt emulsion and a cement against the amount of an aggregate were prepared.

TABLE 3

| Materials | Formulation (% by mass) | | | |
| --- | --- | --- | --- | --- |
| | Sample 6 | Sample 7 | Sample 8 | Sample 9 |
| Aggregate | 92.5 | 85.0 | 80.0 | 75.0 |
| Cement | 2.5 | 5.0 | 6.7 | 8.3 |
| Asphalt Emulsion | 5.0 | 10.0 | 13.3 | 16.7 |
| (ROE*) | (2.85) | (5.70) | (7.58) | (9.50) |
| (Amount of Water) | (2.15) | (4.30) | (5.72) | (7.20) |
| Cement + ROE of Asphalt Emulsion | 5.35 | 10.70 | 14.28 | 17.80 |
| Cement + ROE of Asphalt Emulsion (relative to Aggregate + Cement + ROE of Asphalt Emulsion) | 5.5 | 11.2 | 15.1 | 19.2 |
| Total | 100 | | | |
| | Breakdown of Water Content | | | |
| Water in Asphalt Emulsion (relative to Aggregate + Cement + ROE of Asphalt Emulsion) | 2.20 | 4.49 | 6.07 | 7.76 |
| Additional Water (relative to Aggregate + Cement + ROE of Asphalt Emulsion) | 6.8 | 4.51 | 2.93 | 1.24 |
| Total Water Content | 9.00 | 9.00 | 9.00 | 9.00 |

*ROE: Residue on Evaporation

In the same manner as the mixture "without rolling compaction" in Experiment 1, each sample prepared was filled in a mold and voids were removed by lightly poking with a rod as need, but without ramming by a Marshall Rammer, to obtain a mixture "without" rolling compaction. Subsequently, each mixture was cured for 7 days in the same manner as in Experiment 1. After curing, the dry density (g/cm³), the unconfined compression strength (N/mm²), the primary displacement ($\frac{1}{100}$ cm), and the residual strength rate (%) were measured following the method described in "ROJO SAISEI SEMENTO ASUFARUTONYUZAI ANTEISHORI HAIGOUSEKKEI NO TEBIKI HEISEI 15 NEN" (JAPAN EMULSIFIED ASPHALT ASSOCIATION). The results were shown in Table 4 and FIGS. 5 to 8.

TABLE 4

| Physical Properties* | Sample 6 | Sample 7 | Sample 8 | Sample 9 |
| --- | --- | --- | --- | --- |
| | Cement + ROE of Asphalt Emulsion (relative to Aggregate + Cement + ROE of Asphalt Emulsion) (% by mass) | | | |
| | 5.5 | 11.2 | 15.1 | 19.2 |
| Dry Density (Without rolling compaction) | 1.96 | 1.90 | 1.88 | 1.83 |
| Unconfined Compression Strength (Without rolling compaction) | 1.15 | 1.55 | 1.63 | 1.61 |
| Primary Displacement (Without rolling compaction) | 36 | 8 | 7 | 6 |
| Residual Strength Rate (Without rolling compaction) | 82 | 98 | 96 | 94 |

*Dry Density (g/cm³)
Unconfined Compression Strength (N/mm²)
Primary Displacement (1/100 cm)
Residual Strength Rate (%)

As shown in Table 4 and FIG. 5, the dry density of the cured products, which were obtained by filling the mixture in a mold and curing the mixture in the mold without rolling compaction, gradually decreased along with the increase in the sum of the mass of the cement and the mass of the residue on evaporation of the asphalt emulsion (i.e., "(the mass of the cement)+(the mass of the residue on evaporation of the asphalt emulsion)"). In contrast, as shown in Table 4 and FIG. 6, the unconfined compression strength of the cured products gradually increased along with the increase in "(the mass of the cement)+(the mass of the residue on evaporation of the asphalt emulsion)". When "(the mass of the cement)+(the mass of the residue on evaporation of the asphalt emulsion)" went over 10% by mass of the total dry solid content of the mixture (In this experiment, "(the mass of the aggregate)+(the mass of the cement)+(the mass of the residue on evaporation of the asphalt emulsion)" corresponds to the total dry solid content of the mixture.) and reached 11.2% by mass of the total dry solid content of the mixture (Sample 7), the unconfined compression strength of the cured products went over 1.5 N/mm², which is regarded as the lower limit of the quality standard of a cement-asphalt-stabilized base course. Until when "(the mass of the cement)+(the mass of the residue on evaporation of the asphalt emulsion)" reached 19.2% by mass of the total dry solid content of the mixture (Sample 9), the unconfined compression strength of the mixture was stably over 1.5 N/mm².

As shown in Table 4 and FIG. 7, when "(the mass of the cement)+(the mass of the residue on evaporation of the asphalt emulsion)" was as low as 5.5% by mass of the total dry solid content of the mixture (Sample 6), the primary displacement, which is used as an index for the softness of the cured product, was 36 (¹/₁₀₀ cm). This value is above the upper limit of the general quality standard range of 5 to 30 (¹/₁₀₀ cm), On the other hand, when "(the mass of the cement)+(the mass of the residue on evaporation of the asphalt emulsion)" increased to 11.2% by mass (Sample 7) and went over 10% by mass of the total dry solid content of the mixture, the primary displacement became lower than the upper limit of the general quality standard and higher than the lower limit of the general quality standard, indicating that the softness of the cured products was appropriate and satisfiable.

Furthermore, with respect to the residual strength rate, as shown in Table 4 and FIG. 8, the residual strength rate was "equal to or more than 65%", which is generally regarded as a quality standard, over the entire range of "(the mass of the cement)+(the mass of the residue on evaporation of the asphalt emulsion)" tested in this experiment. This result indicates that the cured product "without rolling compaction" retains the relatively large residual strength even after reaching the maximum strength and is hard to be cracked, at least when "(the mass of the cement)+(the mass of the residue on evaporation of the asphalt emulsion)" is in the range of 5.5% by mass to 20.0% by mass of the total dry solid ("aggregate"+"cement"+"residue on evaporation of the asphalt emulsion") content of the mixture.

Based on the above Experiments 1 and 2, it was shown that, when the mixture comprising the aggregate, the asphalt emulsion and the cement is in a high-water-content state in which the water content of the mixture is above the optimum water content of the aggregate, a base course with a stable strength and a property of being hard to be cracked can be constructed without a step of rolling compaction after spreading the mixture. The water content of the mixture may be preferably 1.4 times or more, and more preferably 1.6 time or more of the optimum water content of the aggregate, when the later mentioned water reducing agent is not added. On the other hand, with respect to the unconfined compression strength, it was shown that, when the cement and the asphalt emulsion are mixed in the mixture at a ratio, in which "(the cement)+(the residue on evaporation of the asphalt emulsion)" is 10% by mass or more of the total mass of the dry solid (In these experiments, "the aggregate"+"the cement"+"the residue on evaporation of the asphalt emulsion"), a base course with the high unconfined compression strength of over 1.5 N/mm², which is the lower limit of the quality standard for the cement-asphalt-stabilized base course, can be constructed without a step of rolling compaction.

The same applies to the primary displacement, which is used as an index for the softness of the cured product, and the residual strength rate, which is used as an index for the remaining strength after reaching the maximum strength. When the cement and the asphalt emulsion are mixed in the mixture at a ratio, in which "(the cement)+(the residue on evaporation of the asphalt emulsion)" is 10% by mass or more and 20% by mass or lower of the total mass of the dry solid (In these experiments, "the aggregate"+"the cement"+ "the residue on evaporation of the asphalt emulsion"), a base course with the high unconfined compression strength over the quality standard value as well as the appropriate softness and residual strength can be constructed.

In the above-described Experiments 1 and 2, the asphalt emulsion and the cement were used such that a ratio of the mass of the residue on evaporation of the asphalt emulsion relative to the mass of the cement is 1.14 to 1, and mixed to the aggregated. However, the ratio of the residue on evaporation of the asphalt emulsion and the mass of the cement is not limited to this specific ratio. Generally, it is considered that the cured product of the mixture becomes harder when the amount of the cement increases, while the cured product of the mixture becomes less hard and becomes more flexible when the amount of the asphalt increases. The ratio of the asphalt emulsion and the cement mixed with the aggregate may be appropriately varied, depending on the property desired for a base course to be constructed. In the viewpoint of constructing a base course that has the good strength and has the property of being hard to be cracked, the asphalt emulsion and the cement may be used and mixed in the mixture at a ratio of "the mass of the residue on evaporation of the asphalt emulsion": "the mass of the cement" of from 0.7:1 to 1.2:1, or at a ratio appropriately varied therefrom.

<Experiment 3: Addition of a Water Reducing Agent and its Effect on the Physical Property of the Cured Product and the Favorable Water Content>

Further experiment was conducted in order to investigate the effect of the addition of a water reducing agent that is generally used in concrete to a mixture comprising an aggregate, an asphalt emulsion, and a cement, on the physical property of the cured product of the mixture and the favorable water content of the mixture.

Materials used in this experiment are described below:

Aggregate: Graded Crushed Stone (Maximum diameter: 40 mm) (Dried)

Asphalt emulsion: MN-1 (Nonionic asphalt emulsion for mixing) (Solid Content: 65% by mass)

Cement: Ordinary Portland Cement

Herein, the optimum water content of the aggregate (graded crushed stone) obtained by the test method for compaction was 5.0% by mass. The aggregate was dried and then used for the experiment.

The aggregate, the asphalt emulsion, and the cement were mixed at a formulation ratio shown in the below Table 5, and the mixtures with the varying composition and water contents were obtained. To these mixtures, the water reducing agent at an amount of 0.5%, 1.0%, or 1.5% by mass of the cement was added, and thus Samples 10 to 19 were prepared. Herein, because the mass of the added water reducing agent is slight compared to the mass of the whole mixture, the mass of the water reducing agent was not taken into consideration when calculating formulation of the composition. In this experiment, a poly(carboxylic acid)-type high performance water reducing agent (Product Name "MIGHTY 3000S", KAO Corporation) was used as the water reducing agent Each of the prepared Samples 10 to 19 was poured into a mold of the dimension of 15 cm×15 cm×53 cm, and, in the same manner as is done for the mixture "without rolling compaction" in Experiment 1, voids were removed by lightly poking with a rod as needed, but without ramming with a Marshall Rammer. Then, the samples were cured over 7 days at 20° C. After curing, each cured sample was taken out from the mold and used as a test sample of the dimension of 15 cm×15 cm×53 cm for the bending strength test. The flexural strength (N/mm²) of each cured sample was measured in accordance with the flexural test method described in "Method of test for flexural strength of concrete." (JIS A1106). Herein, the loading rate of 0.06 N/mm² per seconds was used in the flexural test. The obtained result is shown in Table 5, together with the composition of the samples.

Furthermore, the obtained flexural strength was converted to the unconfined compression strength based on the below formula 2, which is described in "HOSOU SEKKEI SEKOU SHISHIN (HEISEI 18 NEN BAN)" (Japan Road Association, Sep. 18, 2020, Page 270, Appendix Table-8.2.25 The relationship of the flexural strength of the concrete for the pavement and the other strength), and the obtained value was also shown in the below Table 5.

$$fc=(fb/0.42)^{1.5} \ [N/mm^2] \qquad \text{Formula 2}$$

fc: unconfined compression strength [N/mm²]
fb: flexural strength [N/mm²]

As shown in Table 5, in all of Samples 10 to 19, the sum of the mass of the cement and the mass of the residue on evaporation of the asphalt emulsion is more than 10% by mass of the total dry solid content of the mixture, in other words, the total mass of the dry mass of the aggregate, the mass of the cement, and the mass of the residue on evaporation of the asphalt emulsion. The cured products of these samples "without rolling compaction" showed the flexural strength of as high as 1.52 N/mm² or more. When converted to the unconfined compression strength, this flexural strength corresponds to 6.88 N/mm² or more, which is above 1.5 N/mm² (i.e., the lower limit of the quality standard for the unconfined compression strength of the cement-asphalt-stabilized base course) and thus sufficient for practical use as a base course. Being consistent with the foregoing results shown in Experiment 3, it was confirmed that the cement and the asphalt emulsion may be preferably mixed in the mixture such that the sum of the mass of the cement and the mass of the residue on evaporation of the asphalt emulsion is 10% by mass or more of the total mass of the dry solid contained in the mixture.

With respect to the water content, among samples 10 to 17, which was added with the water reducing agent of 0.5% by mass of the cement, the satisfiable flexural strength of 1.52 N/mm² (corresponding to the unconfined compression strength of 7.16 N/mm² when converted in accordance with Formula 2) was obtained even in Sample 10, which has the water content of 1.15 times more than the optimum water content. Meanwhile, in Sample 19, which was added with the water reducing agent of 1.5% by mass of the cement, the high flexural strength of 2.05 N/mm² (corresponding to the unconfined compression strength of 10.78 N/mm² when converted in accordance with Formula 2) was obtained. In

TABLE 5

| | Formulation (% by mass) and Physical Properties | | | | | | | | | |
|---|---|---|---|---|---|---|---|---|---|---|
| Materials | Sample 10 | Sample 11 | Sample 12 | Sample 13 | Sample 14 | Sample 15 | Sample 16 | Sample 17 | Sample 18 | Sample 19 |
| Aggregate | 85.0 | 82.5 | 80.0 | 77.5 | 77.5 | 75.6 | 75.0 | 75.0 | 80.0 | 80.0 |
| Cement | 6.3 | 7.3 | 8.4 | 9.4 | 9.4 | 10.5 | 11.2 | 120 | 9.6 | 7.2 |
| Asphalt Emulsion | 8.7 | 10.2 | 11.6 | 13.1 | 13.1 | 14.5 | 13.8 | 13.0 | 10.4 | 7.8 |
| (ROE*) | (5.7) | (6.6) | (7.5) | (8.5) | (8.5) | (9.4) | (9.0) | (8.5) | (6.8) | (5.1) |
| (Amount of Water) | (3.0) | (3.6) | (4.1) | (4.6) | (4.6) | (5.1) | (4.8) | (4.5) | (3.6) | (2.7) |
| Cement + ROE of Asphalt Emulsion | 12.0 | 13.9 | 15.9 | 17.9 | 17.9 | 19.9 | 20.2 | 20.5 | 16.4 | 12.3 |
| Cement + ROE of Asphalt Emulsion (relative to Aggregate + Cement + ROE of Asphalt Emulsion) | 12.4 | 14.4 | 16.6 | 18.8 | 18.8 | 21.0 | 21.2 | 21.4 | 17.0 | 12.6 |
| Total | 100 | 100 | 100 | 100 | 100 | 100 | 100 | 100 | 100 | 100 |
| Water Reducing Agent (relative to the cement) (% by mass) | 0.5 | 0.5 | 0.5 | 0.5 | 0.5 | 0.5 | 0.5 | 0.5 | 1.0 | 1.5 |
| Water in Asphalt Emulsion (relative to Aggregate + Cement + ROE of Asphalt Emulsion) | 3.14 | 3.70 | 4.23 | 4.81 | 4.81 | 5.35 | 5.08 | 4.77 | 3.78 | 2.81 |
| Additional Water (relative to Aggregate + Cement + ROE of Asphalt Emulsion) | 2.63 | 2.57 | 2.50 | 2.14 | 244 | 2.37 | 2.36 | 2.36 | 2.49 | 2.62 |
| Total Water Content | 5.77 | 6.27 | 6.73 | 6.95 | 7.24 | 7.72 | 7.44 | 7.12 | 6.27 | 5.43 |
| Water Content/ Optimum Water Content | 1.15 | 1.25 | 1.35 | 1.39 | 1.45 | 1.54 | 1.49 | 1.42 | 1.25 | 1.09 |
| Flexural Strength (N/mm²) | 1.56 | 1.61 | 1.56 | 1.52 | 1.62 | 1.78 | 1.86 | 1.87 | 2.30 | 2.05 |
| Unconfined Compression Strength (N/mm²)** | 7.16 | 7.51 | 7.16 | 6.88 | 7.58 | 8.72 | 9.32 | 9.39 | 12.81 | 10.78 |

*ROE: Residue on Evaporation
**Calculated based on Flexural Strength

Sample 19, the water content was 1.09 time more than the optimum water content. From these results, it is concluded that, when the water reducing agent is added to the mixture, the favorable range of the "water content/optimum water content" ratio may be at least 1.05 or more, which is lower than 1.4 or more for the case in which the water reducing agent is not used, although it depends on the addition amount of the water reducing agent.

<Experiment 4: Addition of a Fiber Material and its Effect on the Physical Property of the Cured Products of the Mixture>

Using the same materials as used in Experiment 3 and further a fiber material, Sample 20, a mixture having the composition shown in the below Table 6, was prepared. In the same manner as in Experiment 3, the flexural strength of Sample 20 was measured. Herein, as a fiber material, a basalt fiber (with a fiber diameter of 15 μm and a fiber length of 24 mm) was used. In the composition of Sample 20, the mixed amount of the fiber material of 1% by mass of the whole mixture corresponds to approximately 1.3% by mass of the dry aggregate.

TABLE 6

| Materials | Formulation (% by mass) and Physical Properties Sample 20 |
| --- | --- |
| Aggregate | 79.2 |
| Cement | 9.5 |
| Asphalt Emulsion | 10.3 |
| (ROE*) | (6.7) |
| (Amount of Water) | (3.6) |
| Fiber Material | 1.0 |
| Cement + ROE of Asphalt Emulsion | 16.2 |
| Cement + ROE of Asphalt Emulsion (relative to Aggregate + Cement + ROE of Asphalt Emulsion + Fiber Material) | 16.8 |
| Total | 100 |
| Water Reducing Agent (relative to the cement) (% by mass) | 1.0 |
| Water in Asphalt Emulsion (relative to Aggregate + Cement + ROE of Asphalt Emulsion + Fiber Material) | 3.73 |
| Additional Water (relative to Aggregate + Cement + ROE of Asphalt Emulsion + Fiber Material) | 2.47 |
| Total Water Content | 6.20 |
| Water Content/Optimum Water Content | 1.24 |
| Flexural Strength (N/mm$^2$) | 2.76 |
| Unconfined Compression Strength (N/mm$^2$)** | 16.85 |

*ROE: Residue on Evaporation
**Calculated based on Flexural Strength

The result is shown in Table 6. The cured product of Sample 20 comprising the fiber material showed the drastically increased flexural strength compared to the cured product of Sample 18, which had essentially the same composition as Sample 20 except that it did not comprise the fiber material. This result indicates that the addition of a fiber material very effectively increases the strength of a base course to be constructed.

INDUSTRIAL APPLICABILITY

As above explained, in accordance with the method for constructing a base course without rolling compaction and the mixture for a base course of the present invention, a recycled base course with a stable strength can be constructed without a step of rolling compaction, which involves consumption of a great deal of energy as well as use of heavy equipment, and further without adjusting the water content to the optimum water content. The method for constructing a base course without rolling compaction and the mixture for a base course of the present invention would be advantageous not only in reducing energy consumption but also in reducing workload of the operators, enabling the efficient construction. Therefore, the present invention is of great industrial applicability.

The invention claimed is:

1. A method for constructing a base course without rolling compaction, which comprises:
   a step of obtaining a mixture by mixing an aggregate, an asphalt emulsion, and a cement, wherein the mixture is in a high-water-content state in which a water content of the mixture is above an optimum water content of the aggregate, and
   a step of spreading the mixture;
   wherein the method does not comprise a step of rolling compaction.

2. The method according to claim 1, wherein the asphalt emulsion and the cement are mixed with the aggregate such that the sum of the mass of a residue on evaporation of the asphalt emulsion and the mass of the cement is 10% by mass or more of the total dry solid content of the mixture in said step of obtaining the mixture.

3. The method according to claim 1, wherein the asphalt emulsion and the cement are mixed with the aggregate such that a ratio of the mass of a residue on evaporation of the asphalt emulsion relative to the mass of the cement is in the range of 0.7 or more and 1.2 or less in said step of obtaining the mixture.

4. The method according to claim 1, wherein a fiber material is further mixed in said step of obtaining the mixture.

5. The method according to claim 1, wherein said step of obtaining the mixture is conducted in a plant mixing method.

6. The method according to claim 1, which further comprises a step of obtaining the aggregate by excavating an existing pavement to the depth extending to at least a part of a base course of the existing pavement and by crushing the excavated product;
   and wherein said step of obtaining the aggregate and said step of obtaining the mixture are conducted together at a spot where the base course is to be constructed.

7. A mixture for a base course, comprising an aggregate, an asphalt emulsion, and a cement, wherein the mixture is in a high-water-content state in which a water content of the mixture is above an optimum water content of the aggregate.

8. The mixture according to claim 7, which comprises the asphalt emulsion and the cement in such an amount that the sum of the mass of a residue on evaporation of the asphalt emulsion and the mass of the cement is 10% by mass or more of the total dry solid content of the mixture.

9. The mixture according to claim 7, which comprises the asphalt emulsion and the cement in such a ratio that a ratio of the mass of a residue on evaporation of the asphalt emulsion relative to the mass of the cement is in the range of 0.7 or more and 1.2 or less.

10. The mixture according to claim 7, which further comprises a fiber material.

11. The mixture according to claim 7, wherein a part or the whole of the aggregate is a crushed base course of an existing pavement.

* * * * *